(12) United States Patent
Li et al.

(10) Patent No.: US 11,074,416 B2
(45) Date of Patent: Jul. 27, 2021

(54) TRANSFORMATION OF CHAT LOGS FOR CHAT FLOW PREDICTION

(71) Applicant: INTERNATIONAL BUSINESS MACHINES CORPORATION, Armonk, NY (US)

(72) Inventors: Qi Cheng Li, Beijing (CN); Li Jun Mei, Beijing (CN); Jie Ma, Nanjing (CN); Shao Chun Li, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 173 days.

(21) Appl. No.: 16/199,756

(22) Filed: Nov. 26, 2018

(65) Prior Publication Data

US 2020/0167417 A1    May 28, 2020

(51) Int. Cl.
| | |
|---|---|
| *G06F 40/35* | (2020.01) |
| *H04L 12/58* | (2006.01) |
| *G06F 16/335* | (2019.01) |
| *G06K 9/62* | (2006.01) |
| *G06F 16/36* | (2019.01) |
| *G06F 40/169* | (2020.01) |

(52) U.S. Cl.
CPC ............ *G06F 40/35* (2020.01); *G06F 16/337* (2019.01); *G06F 16/367* (2019.01); *G06F 40/169* (2020.01); *G06K 9/6267* (2013.01); *G06K 9/6298* (2013.01); *H04L 51/02* (2013.01)

(58) Field of Classification Search
CPC ............. H04N 21/4143; H04N 21/433; H04N 21/4622; H04N 21/4722; H04N 21/478; H04N 21/47815; H04N 21/4788; H04N 21/4821; H04N 21/812; H04N 5/44543; H04N 7/163; H04N 21/472; H04N 21/482; H04L 51/04; G06Q 10/10; G06Q 10/107; G06Q 10/06

USPC ........................................................... 704/9
See application file for complete search history.

(56) References Cited

U.S. PATENT DOCUMENTS

| | | |
|---|---|---|
| 8,639,517 B2 | 1/2014 | Di Fabbrizio et al. |
| 9,697,198 B2 | 7/2017 | Davis Jones et al. |
| 2009/0055355 A1* | 2/2009 | Brunner ................ G06Q 30/02 |

(Continued)

OTHER PUBLICATIONS

V. Gligorijevic, M. Skowron and B. Tadic, "Directed Networks of Online Chats: Content-Based Linking and Social Structure," 2012 Eighth International Conference on Signal Image Technology and Internet Based Systems, Naples, 2012, pp. 725-730, doi: 10.1109/SITIS.2012.117. (Year: 2012).*

(Continued)

*Primary Examiner* — Bharatkumar S Shah
(74) *Attorney, Agent, or Firm* — Tutunjian & Bitetto; Joseph Petrokaitis (57) ABSTRACT

Methods and systems for automating user interactions include annotating chat logs to identify user intent in question-answer pairs. A classifier is trained, using the annotated chat log, to identify user intent in automated conversations. Chat flows are formed, using the annotated chat logs, that provide responses to user statements based on identified user intent. An automated conversation is conducted with a user, using the chat flows and the classifier, to provide automated responses to user statements.

17 Claims, 4 Drawing Sheets

(56) References Cited

U.S. PATENT DOCUMENTS

| | | | |
|---|---|---|---|
| 2012/0253825 A1* | 10/2012 | Di Fabbrizio | G06F 40/30 |
| | | | 704/275 |
| 2016/0171505 A1 | 6/2016 | Johri et al. | |
| 2017/0331772 A1* | 11/2017 | Stillabower | H04L 51/04 |
| 2019/0260694 A1* | 8/2019 | Londhe | G06N 20/00 |

OTHER PUBLICATIONS

V. Gligorijevic, M. Skowron and B. Tadic, "Directed Networks of Online Chats: Content-Based Linking and Social Structure," 2012 Eighth International Conference on Signal Image Technology and Internet Based Systems, Naples, 2012, pp. 725-730, doi: 10.1109/SITIS.2012.117. (Year: 201 (Year: 2012).*

Anonymous, Automatically answer questions asked of me based on my previous answers to similar questions, IP.com Disclosure No. IPCOM000234119D, Published Jan. 2013.

* cited by examiner

TRANSFORMATION OF CHAT LOGS FOR CHAT FLOW PREDICTION

BACKGROUND

Technical Field

The present invention generally relates to natural language processing and, more particularly, to the analysis and manipulation of chat logs to form chat flows that characterize common types of conversation for automated chat systems.

Description of the Related Art

Cognitive conversation services are a tool used by companies to provide front-line customer service at a low cost. Automated chat services interact with customers and provide solutions to common problems without the need for the involvement of a human customer service representative. Such systems follow pre-defined chat flows that determine the system's response to given inputs. However, the manual creation of such chat flows is very time-consuming, necessitating the involvement of subject matter experts at every level to ensure that the chat flow follows a logical progression and supplies useful information.

SUMMARY

A method for automating user interactions includes annotating chat logs to identify user intent in question-answer pairs. A classifier is trained, using the annotated chat log, to identify user intent in automated conversations. Chat flows are formed, using the annotated chat logs, that provide responses to user statements based on identified user intent. An automated conversation is conducted with a user, using the chat flows and the classifier, to provide automated responses to user statements.

A system for automating user interactions includes an annotation module configured to annotate chat logs to identify user intent in question-answer pairs. A training module is configured to train a classifier, using the annotated chat log, to identify user intent in automated conversations. A chat flow module includes a processor configured to form chat flows, using the annotated chat logs, that provide responses to user statements based on identified user intent. An automated chat module is configured to conduct an automated conversation with a user, using the chat flows and the classifier, to provide automated responses to user statements.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention provide automated chat services that use chat flows based on chat logs between customer service representatives and customers. Rather than relying on manual creation of chat flows, the present embodiments automatically generate the chat flows using the large volumes of chat records stored by existing customer service operations. The present embodiments thereby create compact, reliable chat flows that address common user interactions, with branching pathways to accommodate different conversational options.

Although the terms "customer service representative" and "customer" are used throughout, it should be understood that the present embodiments can be applied with equal efficacy to any form of conversation-based interaction, including technical support inquiries, medical diagnostic inquiries, and even therapeutic sessions. The present embodiments are particularly appropriate for any form of interaction that includes a question-and-response format, but it should be understood that more free-form conversational structures are also possible.

The present embodiments identify entities within particular sentences (e.g., named entities) and uses the identified entities to cluster sentences within a chat log base. The present embodiments then train a classifier for "hot topic" clusters and frequent questions, merging sentences as appropriate, to create a chat flow.

Figure 1:
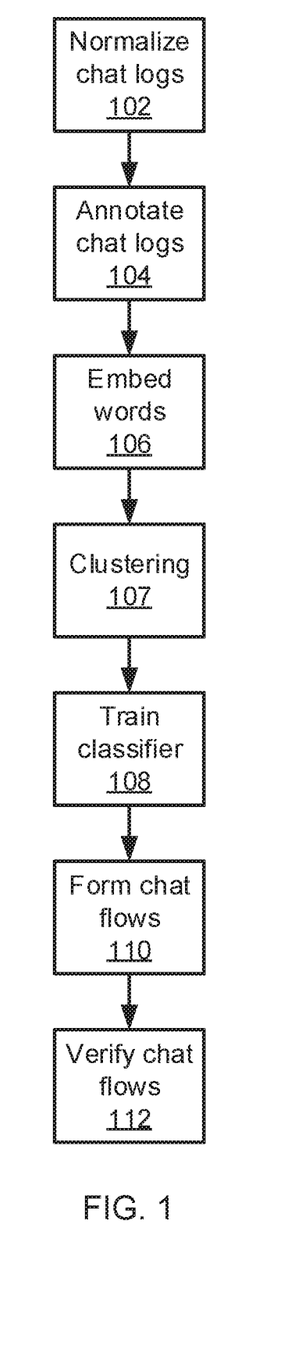
FIG. 1 is a block/flow diagram of a method for forming chat flows based on a set of existing chat logs that uses a multi-layer clustering to identify conversational paths in accordance with an embodiment of the present invention.

Referring now to FIG. 1, a method of generating chat flows from a corpus of chat logs is shown. Block 102 normalizes the chat logs. Normalization includes separating logs into individual conversations and formatting the conversations into statement-response pairs. It should be understood that the statement-response pairs can be defined as a first statement by a customer or user, followed by a response by the customer service representative. The first statement may be a question, but any appropriate input can be considered a statement. The normalization process may therefore concatenate multiple entries into a single statement or response, for example if one party makes multiple statements in a row.

Block 104 annotates the chat logs. Annotation identifies named entities within each chat log using any appropriate named entity recognition method. Exemplary named entity recognition methods include linguistic grammar-based techniques and statistical models. It is therefore contemplated that annotation can be performed automatically, but it should be understood that annotation can also be performed manually by subject matter experts. A "named entity" can be any identified (as opposed to general) noun in the text. Annotation not only includes locating named entities within the chat logs, but identifying an associated entity type for each named entity. For example, named entity types can include person names, organizations, locations, times, quantities, monetary values, percentages, or any other appropriate type of information.

Annotation furthermore includes identifying relationships between entities. For example, if two entities are found within the same sentence, then block 104 indicates a relationship between the entities. The identified entity types and relationships between entities are used to construct an ontology model. The ontology model can be formed by linking all entities according to the identified relationships between the entities and then constructing a graph, where the entities are nodes and the relationships are edges. This graph can be used as the ontology model for the domain of the chat logs.

As an example of annotation, the following text represents an exemplary annotated chat log. In this case, the annotation identifies entities, such as [orderID], [SKU], [order status], [date], [location], and any other appropriate named entity.

Q: The transportation status is stuck. Can I get it this afternoon? [orderID]
A: Is there anything that I could help?
Q: The transportation status has not updated. It seems that it cannot be delivered today.
A: I am really sorry. I am serving multiple customer now so apologies for my late reply. Please wait a minute and I will get back to you soon. [Emoji]
Q: No hurry. Just check when [orderID] could be delivered.
A: Your order has been [order status] by [location], and is on the way to [location].
A: Your order will be delivered approximately on [date].
Q: I am confused. It has not updated. It should be in [location] already. Anyway. I am done.

By identifying named entities within the conversation and annotating them with their respective entity types, the case-specific chat log can be converted into a conversation chat flow such as that shown in FIG. 2 below.

Block 106 embeds the words of the chat logs into a semantic space. Block 106 thereby generates vectors that represent the words in the chat logs. Block 107 then clusters the sentences and conversations using these vectors. A first model is used to determine whether the topic of a given sentence or conversation is a "hot topic" or a rare topic, while a second model is used to label each cluster. Hot topics are identified by clustering the distribution of conversation counts of the clusters. If the conversation count of a cluster is greater than a threshold, the cluster relates to a hot topic. Chat flows are only formed for hot topics. If a user's conversation at runtime is not a hot topic, the conversation system will use information retrieval or deep learning to formulate responses instead of using predefined chat flows.

Clustering can first be performed by clustering the answer portion of question-answer pairs, as these are often stock responses from customer service representatives. Clustering is then performed on the questions within particular answer clusters. The question clustering can be performed with associated forward-looking answers (e.g., with the answer that follows the question) or with backward-looking answers (e.g., the answer that preceded the question).

Block 108 uses the labeled clusters to train a classifier using the clustered questions. The classifier can be any appropriate machine learning classifier, for example using a neural network or support vector machine model. The classifier is trained to identify an appropriate label for input text. The chat logs that are clustered and labeled in blocks 106 and 107 are thus used as training data for the classifier, part of which may be used for an initial training and part of which may be used to verify the accuracy of the trained classifier. The classifier is later to determine whether the topic is a "hot topic." An intent model is trained using the question portions of question-answer pairs in a cluster.

Block 110 forms chat flows from the chat logs, with the chat flows being represented as a conversational flow with question-answer structure. Block 110 uses the intent model to recognize the intent of particular user statements. For example, if the user says, "I want to buy something," or, "I want to make a purchase," the intent model will recognize either statement as representing the same intent. Each position in the chat flow is represented as a chat flow node or a sub flow. A chat flow node is a node that includes an answer as the node text and entities or intents extracted from the associated question as the node condition. A chat flow node can be understood as a branching decision node in the flow, where particular entities or intents in the question will select a particular sub flow following the chat flow node. A sub flow is a set of concurrent chat flow nodes. Block 110 thus determines, for each point in the chat flow, whether there are concurrent sub-flows coming from a particular chat flow node. These concurrent flows can then be represented in a single chat flow, using the chat flow node to branch between them. Block 110 can furthermore merge multiple chat flows when it is determined that particular sub-flows can be represented concurrently. Block 110 can thus output a graph-structure that represents the chat flow.

Block 112 can then verify the chat flows as being valid and natural-sounding. This can be performed by subject matter experts who can furthermore refine chat flows as needed, refining node text, sequence, links, and conditions to make the chat flows conform better to expected behavior. Because the chat flows have already been constructed, the burden on subject matter experts is substantially reduced. It should be noted that verification can be performed during use of the chat flows, with customers flagging incorrect or awkward chat flows for later review.

Figure 2:
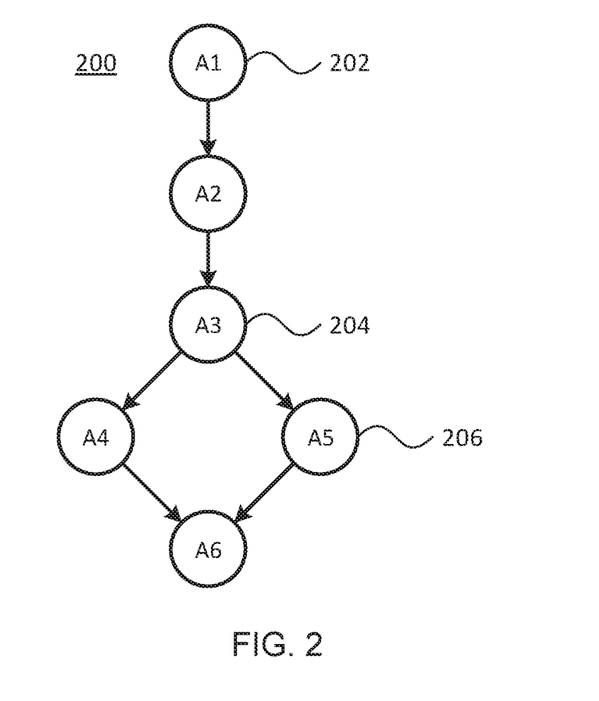
FIG. 2 is a diagram of a graph that represents a chat flow and includes multiple conversational branches in accordance with an embodiment of the present invention.

Referring now to FIG. 2, an exemplary chat flow 200 is shown. The chat flow is made up of individual chat flow nodes 202, each of which can represent an answer from a particular question-answer pair, the text of the answer, and the identified entities and/or intents from the associated question. A branching chat flow node 204 is shown, with two respective sub-flows 206 coming from it. The chat flow 200 will take one of the sub-flow paths 206, depending on what information the question associated with node A3 contains.

The can flow 200 can alternatively be represented as separate chat flows, with the progressions A1-A2-A3-A4-A6 and A1-A2-A3-A5-A6, respectively. These chat flows are merged into the single chat flow 200 because nodes A1, A2, A3, and A6 are shared, making it possible to identify A4 and A5 as different possible sub-flows 206 within the chat flow. This determination can be further founded on the identification of relevant contextual information in the other nodes of the chat flow 200. During use, a chat system will automatically determine the most appropriate sub-flow 206 from any branching node 204, based on the conditions stored in the branching node 204.

Figure 3:
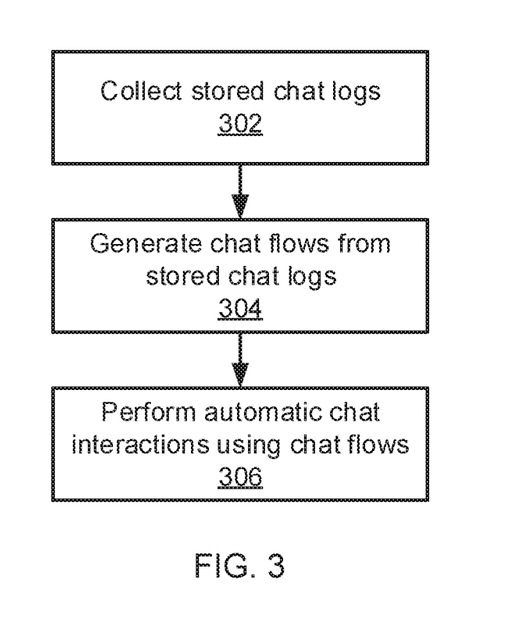
FIG. 3 is a block/flow diagram of a method of performing an automated user interaction by collecting chat logs, generating chat flows from the chat logs, and responding to users in a manner dictated by the chat logs in accordance with an embodiment of the present invention.

Referring now to FIG. 3, a method for performing automatic chat interactions is shown. Block 302 collects stored chat logs that have been collected manually. It is specifically contemplated that the stored chat logs may be generated by customer service representatives interacting with customers, with or without a set of template responses. The customer service representatives thus generate a large volume of data about how common interactions are performed, providing a wealth of information that can be used to train an automatic chat system.

Block 304 generates chat flows from the stored chat logs, as described above. Each chat flow can represent a set of question-answer pairs connected in a graph structure, where each question-answer pair leads to another and each user's statement generates an automated response, until some end condition has been reached. The end condition can be, for example, a statement by the user indicating that the user is satisfied with the response, a valediction, the termination of the connection, or any other action that has been shown by the chat logs to terminate the interaction.

Block 306 then uses the chat flows to perform automated chat interactions. The interactions can take place over any appropriate medium, including text, audio, and audiovisual mediums. While text chat is the simples to implement, needing only natural language processing to recognize the intent of the user, audio chat is also possible using automatic speech recognition and voice synthesis. Similarly, video processing can be used to gain additional information regarding the user's intent from, e.g., the user's facial expressions. A chat avatar can then be graphically represented using any appropriate technology to provide a full audiovisual response to the user's questions.

At each question from the user, block 306 evaluates the next step using the chat flow. The user's intent is determined as described above, for example using the trained classifier including any named entities, and block 306 compares the intent and the entities to conditional information in the nodes 202 of the chat flow. Once a next node has been determined, block 306 provides a response, dictated by the chat flow, to the user. Block 306 may insert pauses after a user's statement to replicate the response time that a human customer service representative might take to send a reply. This continues until the chat flow reaches some end condition, at which point the interaction is terminated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
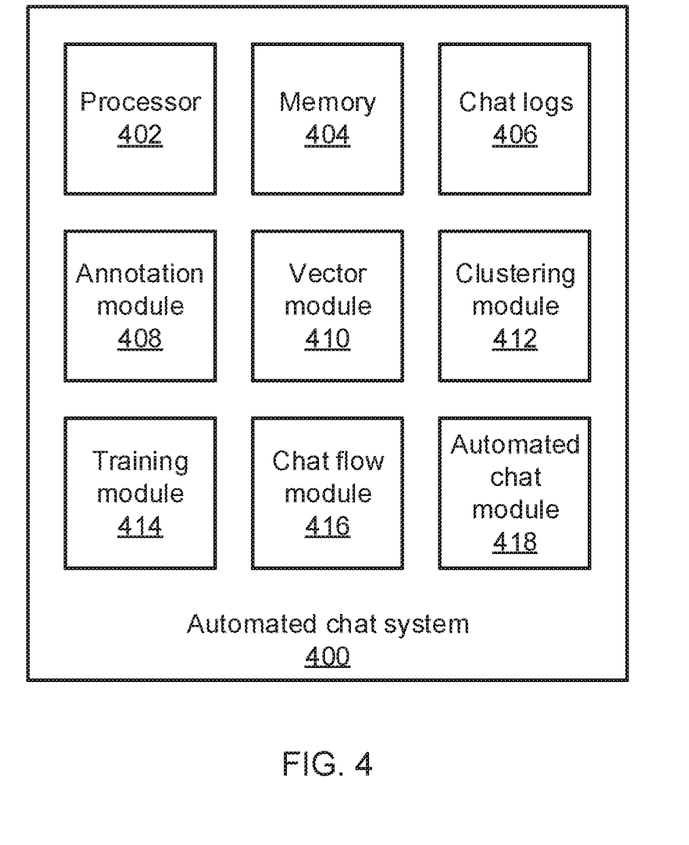
FIG. 4 is a block diagram of a system that performs an automated user interaction by collecting chat logs, generating chat flows from the chat logs, and responding to users in a manner dictated by the chat logs in accordance with an embodiment of the present invention.

Referring now to FIG. 4, an automated chat system 400 is shown. The chat system 400 includes a hardware processor 402 and memory 404. The memory 404 stores a set of normalized chat logs 406 that have been previously collected, for example by the interactions of customers with human customer service representatives. The chat logs 406 can be normalized before use by the automated chat system 400 or can be normalized within the automated chat system 400.

The system 400 also includes one or more functional modules. Each of the one or more functional modules can, in some embodiments, be implemented as software that is stored in the memory 404 and that is executed by hardware processor 402. In other embodiments, one or more of the functional modules can be implemented as one or more discrete hardware components, for example in the form of application-specific integrated chips or field-programmable gate arrays.

An annotation module 408 annotates the chat logs 406, identifying question-answer pairs and finding customer intents and named entities. A vector module 410 the statements of the user and the customer service representative in the chat logs 406 into vectors in a semantic space so that the clustering module 412 can perform a multi-level clustering operation, first clustering according to the customer service representative's answers and then, within those clusters, clustering according to the previous or subsequent customer question. These clusters are used to label the statements. The training module 414 uses the labeled statements to train a classifier that can be used to identify user intent and whether the topic of discussion is a "hot topic."

A chat flow module 416 uses the annotated chat logs 106 to generate chat flows. Each chat flow includes a number of nodes that dictate system responses based on the user's statements. The automated chat module 418 then uses the chat flows generated by the chat flow module 416 to conduct an automated interaction with a user as described above.

Figure 5:
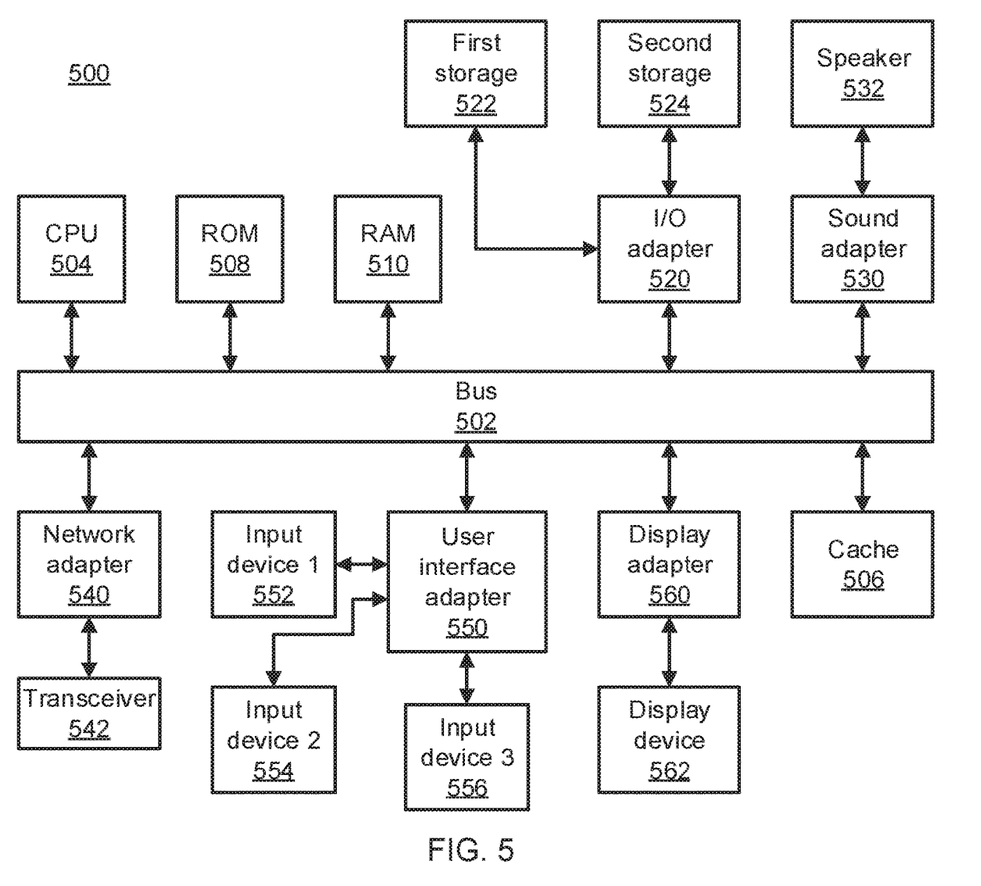
FIG. 5 is a block diagram of a processing system in accordance with an embodiment of the present invention.

Referring now to FIG. 5, an exemplary processing system 500 is shown which may represent the automated chat system 400. The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

Having described preferred embodiments of transformation of chat logs for chat flow prediction (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for automating user interactions, comprising:
    annotating a plurality of chat logs to identify user intent in question-answer pairs;
    training a classifier, using the plurality of annotated chat logs, to identify user intent in automated conversations;
    forming chat flows, using the plurality of annotated chat logs, that provide responses to user statements based on identified user intent, including merging chat flows that represent individual chat logs of the plurality of annotated chat logs into a branching chat flow; and
    conducting an automated conversation with a user, using the chat flows and the classifier, to provide automated responses to user statements.

2. The computer-implemented method of claim 1, wherein annotating the plurality of chat logs is performed automatically using named entity recognition.

3. The computer-implemented method of claim 1, wherein annotating the plurality of chat logs further comprises identifying question-answer pairs that include a question portion from a first conversant and an answer portion from a second conversant.

4. The computer-implemented method of claim 3, further comprising clustering the plurality of annotated chat logs according to a first-layer clustering based on the answer portions of the question-answer pairs.

5. The computer-implemented method of claim 4, further comprising clustering the clustered chat longs according to a second-layer clustering based on the question portions of the question-answer pairs.

6. The computer-implemented method of claim 1, wherein each chat flow is represented as a directed graph, with each node representing an answer portion from a particular question-answer pair that is indicated based on a question portion.

7. The computer-implemented method of claim 6, wherein conducting the automated conversation comprises applying the classifier to a question input by a user to determine a user intent, identifying a next node in a conversational chat flow based on the identified user intent, and issuing a response indicated by the identified next node.

8. The computer-implemented method of claim 1, further comprising normalizing the plurality of chat logs before annotating, wherein the plurality of chat logs are generated by human operators in conversation with users.

9. A non-transitory computer readable storage medium comprising a computer readable program for automating user interactions, wherein the computer readable program when executed on a computer causes the computer to perform the steps of:
    annotating a plurality of chat logs to identify user intent in question-answer pairs;
    training a classifier, using the plurality of annotated chat logs, to identify user intent in automated conversations;
    forming chat flows, using the plurality of annotated chat logs, that provide responses to user statements based on identified user intent, including merging chat flows that represent individual chat logs of the plurality of annotated chat logs into a branching chat flow; and
    conducting an automated conversation with a user, using the chat flows and the classifier, to provide automated responses to user statements.

10. A system for automating user interactions, comprising:
    an annotation module configured to annotate a plurality of chat logs to identify user intent in question-answer pairs;
    a training module configured to train a classifier, using the plurality of annotated chat logs, to identify user intent in automated conversations;
    a chat flow module comprising a processor configured to form chat flows, using the plurality of annotated chat logs, that provide responses to user statements based on identified user intent, including merger of chat flows that represent individual chat logs of the plurality of annotated chat logs into a branching chat flow; and
    an automated chat module configured to conduct an automated conversation with a user, using the chat flows and the classifier, to provide automated responses to user statements.

11. The system of claim 10, wherein the annotation module is further configured to annotate the plurality of chat logs automatically using named entity recognition.

12. The system of claim 10, wherein the annotation module is further configured to identifying question-answer pairs that include a question portion from a first conversant and an answer portion from a second conversant.

13. The system of claim 12, further comprising a clustering module configured to cluster the plurality of annotated chat logs according to a first-layer clustering based on the answer portions of the question-answer pairs.

14. The system of claim 13, wherein the clustering module is further configured to cluster the clustered chat longs according to a second-layer clustering based on the question portions of the question-answer pairs.

15. The system of claim 10, wherein each chat flow is represented as a directed graph, with each node representing an answer portion from a particular question-answer pair that is indicated based on a question portion.

16. The system of claim 15, wherein the automated chat module is further configured to apply the classifier to a question input by a user to determine a user intent, to identify a next node in a conversational chat flow based on the identified user intent, and to issue a response indicated by the identified next node.

17. The system of claim 10, wherein the annotation module is further configured to normalize the plurality of chat logs before annotating, wherein the plurality of chat logs are generated by human operators in conversation with users.

\* \* \* \* \*